Sept. 25, 1945.　　　A. P. BANUA　　　2,385,600
DISPENSING CONTAINER
Filed Sept. 23, 1943　　　2 Sheets-Sheet 1

Alberto P. Banua,
INVENTOR.

BY
Victor J. Evans & Co.
ATTORNEYS

Sept. 25, 1945.  A. P. BANUA  2,385,600
DISPENSING CONTAINER
Filed Sept. 23, 1943   2 Sheets-Sheet 2
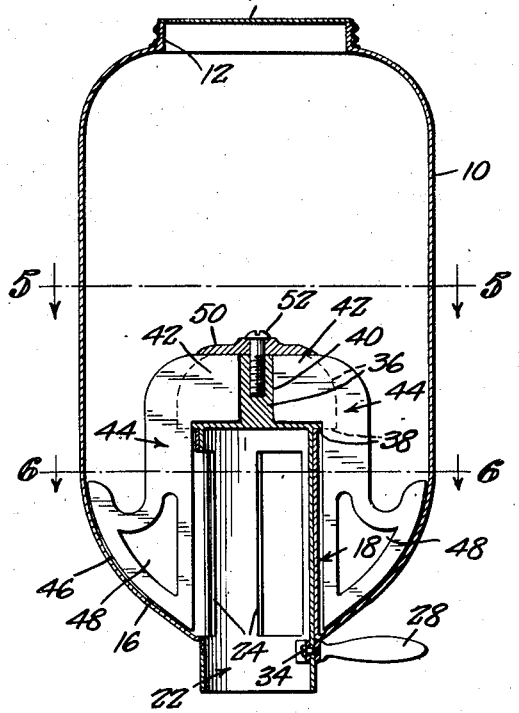
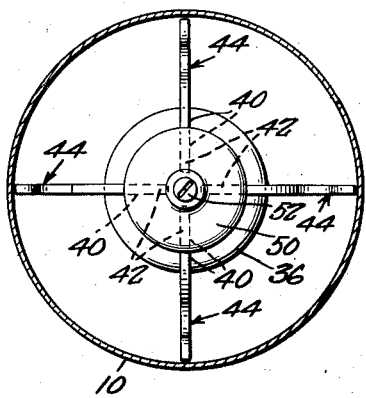
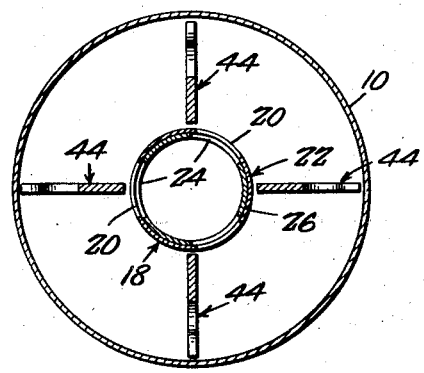
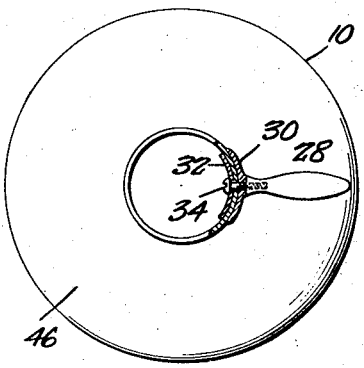
Alberto P. Banua,
INVENTOR.
BY
*Victor J. Evans & Co.*
ATTORNEYS Patented Sept. 25, 1945

2,385,600

UNITED STATES PATENT OFFICE 2,385,600

DISPENSING CONTAINER

Alberto P. Banua, Kalaheo, Territory of Hawaii

Application September 23, 1943, Serial No. 503,538

2 Claims. (Cl. 222—248)

My invention relates to containers for non-liquid foods of a granulated or pulverized nature such as sugar, coffee and the like, and has among its objects and advantages the provision of an improved dispensing container.

In the accompanying drawings:

Figure 4 is a vertical sectional view;

Figure 5 is a sectional view taken along the line 5—5 of Figure 4;

Figure 6 is a sectional view taken along the line 6—6 of Figure 4; and

Figure 7 is a bottom view with a portion broken away for the purpose of illustration.

Figure 1:
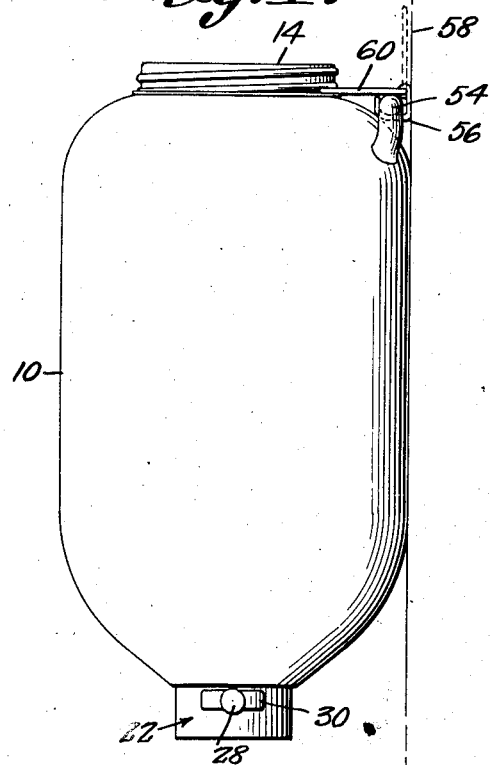
Figure 1 is a side view of the invention.

In the embodiment of my invention selected for illustration, I make use of a container 10 having a neck 12 at its upper end to which is detachably connected a screw cap 14. The bottom end of the container is tapered, as at 16, and is provided with an axial tube 18 constituting an outlet opening. A plurality of slots 20 is provided in the tube 18 to establish communication between the tube and the container 10 for the passage of its contents.

Inside the tube 18 is rotatably mounted a valve tube 22 having slots 24 arranged for registration with the slots 20 through rotation of the valve tube inside the tube 18. The slots 24 may be completely closed by the unslotted wall areas 26 of the tube 18 when the tube 22 is rotated to a predetermined position. Similarly, the slots may be brought into variable degrees of registration to secure a slow or rapid flow of the contents.

A handle 28 is attached to the tube 22 to facilitate rotation thereof. The tube 22 projects slightly beneath the lower end of the tube 18 to constitute a dispensing spout as well as to serve as a mount for the handle 28. Figure 7 illustrates the handle 28 as being provided with a bar 30 curved to fit the tube 22 with a resilient member 32 engaging the inner face of the tube. A screw 34 is passed through aligned openings in the tube 18, the flange 30, and the member 32 and threaded into the handle 28 for fixedly securing the handle to the tube.

To the upper end of the tube 22 is fixedly secured a head 36 of slightly greater diameter than the tube 18 to provide an annular shoulder 38 having engagement with the upper end of the tube 18. Thus the handle 28 and the shoulder 38 restrain the tube 22 from axial movement relatively to the tube 18. The head 36 is provided with a plurality of radial slots 40 in which are positioned wings 42 on agitators 44 arranged radially of the container 10. The agitators 44 are preferably cut from sheet metal and have edge contours 46 conforming to the taper 16. The agitators are also provided with openings 48 to eliminate objectionable resistance and to increase the agitating action.

The agitators 44 are fixedly secured in assembled relationship with the head 36 by means of a disk 50 engaging the upper edges of the wings 44 and clamped thereagainst by a screw 52 passing through a central opening in the disk and threaded into the head 36.

Figure 2:
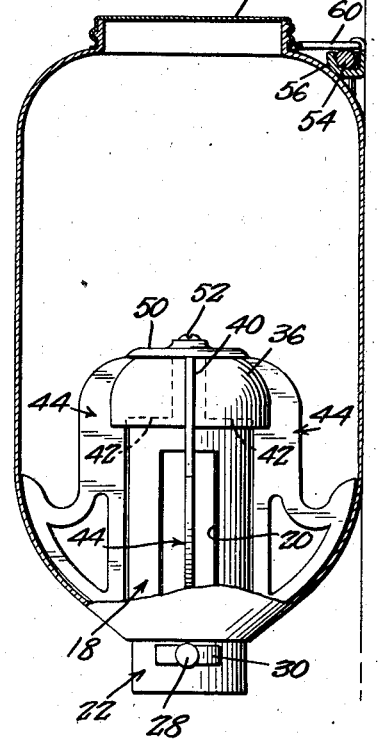
Figure 2 is a similar view but illustrating the container in section.
Figure 3:
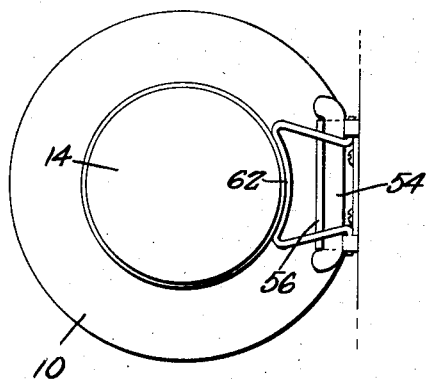
Figure 3 is a top plan view.

Figures 1, 2 and 3 illustrate the container 10 as being provided with a loop 54 engageable in a hook 56 secured to a wall or other support 58. To the hook 56 is pivotally connected a latch member 60 formed of wire and bent to provide a curved bight 62 engageable with the cap 14 to hold the loop 54 in the hook 56. The bight 62 presses firmly against the cap 14 or lies partly inside a screw thread formation thereon, the wire from which the latch 60 is made being sufficiently resilient for this purpose. The hook 56 is of considerable length when viewed according to Figure 3 so as to restrain the container 10 from rotation when the handle 28 is being manipulated.

The present invention provides a dispensing container wherein the agitators 44 are of flat-like material easily assembled with the head 36 to provide an agitator which imparts efficient agitation to the contents of the container. The two tubes 18 and 22 provide a valve structure which may be operated to dispense the contents in a rapidly flowing stream as well as to regulate the flow in desired quantities.

Without further elaboration, the foregoing will so fully illustrate my invention, that others may, by applying current knowledge, readily adapt the same for use under various conditions of service.

I claim:

1. A dispensing container formed with an interiorly located tube in its lower end constituting an outlet for the container and the wall of the tube provided with openings communicating with the interior of the container, a second tube mounted within the first tube and projecting out from the bottom of the container, said second tube being rotatable with respect to the first tube and having openings registering with those in the first tube to dispense contents from the container to the second tube, an enlarged head on the second tube forming a shoulder engaging the end of the first tube to hold the second tube in position in the first tube, said head having slots, wing members seated in the slots, a cap on the head holding the wing members in the slots, and the lower edges of the wings contoured to approximate the interior contour of the walls of the container and arranged adjacent thereto.

2. A dispensing container formed with a vertically arranged interiorly located tube in its lower end constituting an outlet for the container and the wall of the tube provided with openings communicating with the interior of the container, a second tube rotatably mounted in the first tube and projecting from the bottom of the container and having openings therein registering with those in the first tube to dispense contents from the container to the second tube, an enlarged head having a diameter greater than the tubes mounted on the second tube and providing a shoulder engaging the first tube to hold the second tube in position in the first tube, said head having radial slots in its sides, wing members provided with openings in their bodies and edges conforming in contour with the contour of the walls of the container, and mounted in said slots to extend radially toward the walls of the container, a cap on the head and means detachably fastening the cap to the head to hold the wings in the slots.

ALBERTO P. BANUA.